May 9, 1967

L. D. LAKE ETAL 3,319,023

PRESSURE SWITCH MEANS

Filed June 11, 1965

INVENTORS
LELYN D. LAKE
JOHN C. JONES

BY
Robert Levine

ATTORNEY

INVENTORS
LELYN D. LAKE
JOHN C. JONES
BY
ATTORNEY

United States Patent Office 3,319,023
Patented May 9, 1967

3,319,023
PRESSURE SWITCH MEANS
Lelyn D. Lake, Carmel, and John C. Jones, Indianapolis, Ind., assignors to P. R. Mallory & Co. Inc., Indianapolis, Ind., a corporation of Delaware
Filed June 11, 1965, Ser. No. 463,195
20 Claims. (Cl. 200—81)

The present invention relates to a condition responsive means, more particularly to a fluid pressure responsive means incorporating a novel control means and novel overcenter snap action switch means that is a self contained unit particularly useful in regulating the crest level of a fluid retained within a fluid container.

In pressure switches cooperatively associated with electrical appliances, it is desirable that the pressure switch be capable of being responsive to a plurality of predetermined fluid pressures such that the operator may select a desired fluid fill level from a plurality of possible fluid fill levels. It is also desirable that the fluid pressure responsive means also includes means that compensates for variations in the mechanical components as a result of mass production of the switches. The variations may introduce variations in fluid fill level of several different fluid pressure responsive means. It is necessary that the fluid pressure responsive means be inherently capable of resetting itself if the fluid container is connected with other means which cycles the fluid into and out of the fluid container.

The pressure sensitive means for the present invention is particularly useful when utilized with an electrical agitating means such as a washing machine or the like. However, it is not intended that the utility of the present invention be restricted to use only with devices such as a washing machine. It will be apparent to those possessing ordinary skill in the art that the present invention would have utility when used in conjunction with many other devices wherein it is desirable to actuate an operatively associated device when a predetermined pressure is exceeded. However, since the use of the present invention is adequately illustrated when coupled with a washing machine, and in order to facilitate the structural and functional description of the present invention, the present invention will be described in conjunction with a washing machine.

It is known in the fluid pressure sensing art that a flexible sheet means such as a diaphragm pressure responsive device may be used as a responsive means to actuate cooperatively associated means when a particular pressure is altered. Such devices have been used to actuate cooperatively associated means when a determined fluid crest level has been exceeded in a fluid container. However, when the diaphragm pressure responsive device is cooperatively associated with the known snap switches, the height of the fluid level in a fluid container may be regulated with only a fair degree of accuracy.

A more accurate means of controlling the fluid level in a fluid container is by use of either a control valve or a float arm that are sensitive to the fluid crest level within the fluid container. However, these means are unsatisfactory in accurately controlling fluid level when exposed to the violent agitation of the fluid contained within a device such as an agitating washing machine.

We have found that a control means that is capable of accurately regulating the fluid pressure at which the cooperatively associated diaphragm means is activated from a first position to a second position may be used to accurately control the crest level of fluid contained within the fluid container. In addition, if a calibration means was incorporated into the control means, the activation of the diaphragm means could be more accurately controlled in that the calibration means would compensate for minor mechanical, non-linear variations of the diaphragm means and the other components of the control means.

In addition the control means of the present invention includes a novel overcenter snap action switch that has a novel return spring and has a plurality of substantially straight line springs in lieu of the conventional U-shaped spring. The use of the novel return spring and the novel plurality of straight line springs permits the control means to achieve a more positive action than possible to achieve with the conventional U-shaped spring commonly associated with snap action switches.

Therefore, it is an object of the present invention to provide an adjustable condition responsive means including a novel control means that permits a flexible sheet means to be responsive to one of a plurality of condition levels.

Another object of the present invention is to provide an adjustable fluid pressure responsive means having a novel control means including a calibrating means that accurately controls the fluid pressure level of a plurality of available fluid pressures to which the diaphragm means is responsive.

Still another object of the present invention is to provide an adjustable fluid pressure responsive means as hereinafter described which is of sturdy construction and so composed as to be a self-contained device that is characterized by its accuracy of operation.

Yet still another object of the present invention is to provide an adjustable fluid pressure responsive means that is efficient, inexpensive, simple, accurate, and effective in operation.

A further object of the present invention is to provide a manually adjustable condition responsive means inherently possessing an infinite number of predetermined condition responsive settings.

Another object of the present invention is to provide a manually adjustable fluid pressure responsive means including a control means responsive to a plurality of fluid pressure levels and having a fixed reset pressure level.

Yet another object of the present invention is to provide a manually adjustable fluid pressure responsive means including a control means responsive to a plurality of fluid pressure levels and having a plurality of fixed differential reset pressure levels.

Yet still another object of the present invention is to provide a control means having an overcenter snap switch that includes a plurality of straight line springs and a return spring.

Still another object of the present invention is to provide a manually adjustable fluid pressure responsive means including a control means that resets itself after a predetermined point in a cycle has been attained.

The present invention in another of its aspects relates to novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Also other objects will appear in the following description, appended claims, and appended drawings. The invention resides in the novel construction, combination, arrangement, and cooperation of elements as hereinafter described and more particularly as defined in the appended claims.

The appended drawings illustrate several novel and different embodiments of the present invention constructed to function in the most advantageous modes devised for the practical application of the basic principles involved in the hereinafter described invention.

Generally speaking, the means and methods of the present invention relate to a novel manually adjustable condition responsive sensitive means for accurately controlling the condition present in a condition container.

The device is manually adjustable and responsive when a predetermined condition is exceeded. The device comprises a movable means that is responsible to a condition such as fluid pressure. A switch is responsive to the displacement of the movable means after a predetermined condition is exceeded. A means couples the switch to the movable means. An adjustable control means engages the switch so as to prevent actuation of the switch until the predetermined condition is exceeded.

More particularly, the device of the present invention is an adjustable fluid pressure responsive means actuated when a predetermined fluid pressure is exceeded. The device includes a housing and a flexible sheet such as a diaphragm means mounted in the housing so as to define a first compartment and a second compartment. The flexible sheet is substantially smooth on both faces thereof. A first aperture in the housing is to the first compartment so that the compartment communicates with a fluid pressure. A second aperture in the housing goes to the second compartment. A movable means extends through the second aperture and engages a substantially smooth face of the sheet so that the movable means is displaced by the sheet as the sheet responds to the fluid pressure. A switch is responsive to the displacement of the movable arm after a predetermined fluid pressure is exceeded. The switch comprises a displaceable contact carrying blade means, a movable contact means underlaying and normally engaging the contact carrying blade means, a fixed contact means overlaying and normally disengaged with the contact carrying blade means, an actuator arm for displacing the blade means to an engaged position with said fixed contact after the predetermined fluid pressure is exceeded, a straight line spring means coupling the actuator arm to the blade means, the spring means storing energy as the actuator arm is displaced and releasing the stored energy when the actuator arm exceeds the predetermined fluid pressure, means for coupling the movable means to the actuator arm, and a return spring means for snapping back the blade means to engagement with the movable contact when the predetermined fluid pressure no longer exists.

An adjustable control means is mounted in proximity with the switch so as to prevent actuation of the switch until the predetermined fluid pressure is exceeded. The control means includes a cam carrying shaft carrying thereon a detent cam means having rise and fall contours and a calibration means having a floating characteristic on the shaft. A spring means biases the detent cam into frictional engagement with the calibration means so that rotational displacement of the cam means rotationally displaces the calibration means. The calibration means may also be rotationally displaced independent of the cam means and the shaft to thereby position the calibration means independently of the cam means. A U-shaped means including a cam follower arm riding on the contours of the detent cam. The cam follower are and the detent cam cooperate to locate a predetermined position on the calibration means. A member of said U-shaped means rides on the contour of the calibration means and is displaced in accordance with the contour thereof. A pin is connected to the member and displaceable therewith. The pin biases the movable contact of the switch to one of a plurality of positions thereby determining the predetermined fluid pressure to which the switch is responsive. An adjustable means is utilized for determining the fluid pressure at which the switch is reset. The adjustable means includes a means for biasing the return spring to one of a plurality of positions thereby regulating the rest position of the switch.

The embodiment of the manually adjustable fluid pressure responsive means is similar except that the adjustable means is utilized to bias the movable contact of the switch to one of a plurality of positions thereby determining the predetermined fluid pressure to which the switch is responsive. In addition the pin of the control means is utilized to bias the return spring of the switch to one of a plurality of positions thereby determining the fluid pressure at which the switch is reset.

Figure 1:
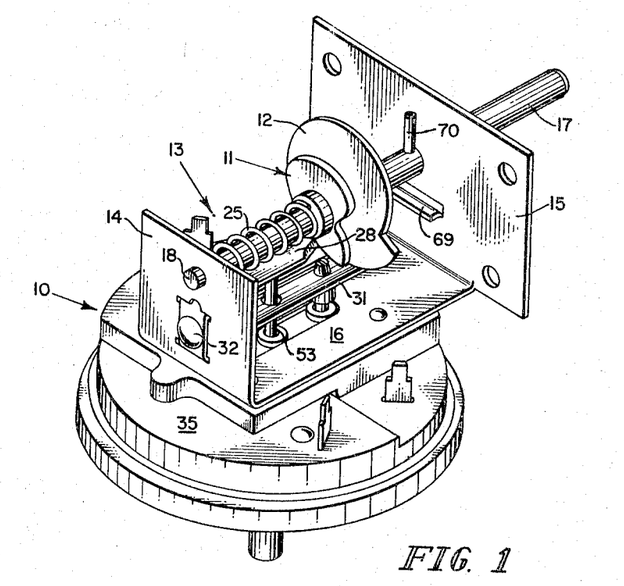
FIGURE 1 is a perspective view of the manually adjustable condition responsive means illustrating the cam means and the calibration means of the control means of the present invention.

Referring now to the drawings, which illustrate the preferred embodiments of the present invention, the fluid pressure responsive means is generally indicated by the numeral 10. A cam means 11 and a calibration means 12 of control means 13 are shown to be located between end plate 14 and end plate 15 of mounting bracket 16. It is seen that the respective end plates of the mounting bracket are in spaced, parallel relationship. The cam means 11 and the calibration cam means 12 are located between the end plates by means of cam shaft means 17 that is journalled in the respective end plates. It is seen that extremity 18 of the cam shaft interfits with aperture 19 of end plate 14 and that the opposite extremity of the cam shaft interfits with and projects through aperture 20 of end plate 15.

A C-ring 21 interfits with and is substantially locked to circumferential groove 22 of the cam shaft. It is seen that the outer periphery of the C-ring has a substantially greater radial extent than the radial extent of the periphery of the cam shaft. The reason therefore will be enumerated hereinlater.

Figure 2:
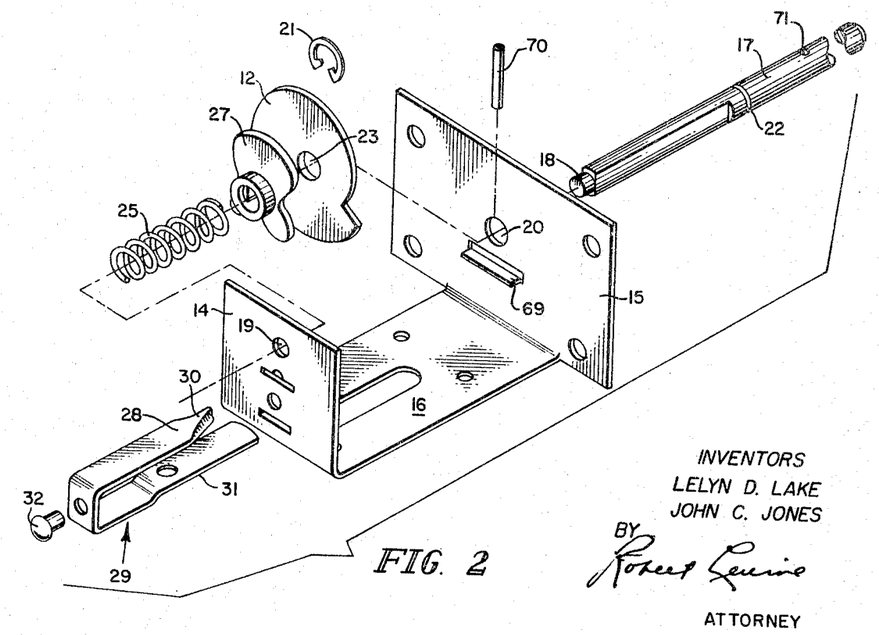
FIGURE 2 is an exploded perspective view of the various components of the control means illustrating the relative position of each component within the control means.

The cam shaft means includes a double D-shaped configuration that traverses substantially the entire longitudinal length of the shaft means from the vicinity of the circumferential groove 22 to extremity 18 of the shaft means. Aperture 23 in the calibration means 12 interfits with the cam shaft in such a manner so that a face of the calibration means abuts the C-shaped ring. The aperture of the calibration means is sufficiently large so that the calibration means may be rotationally displaced independent of the cam shaft if so desired, yet the aperture 23 is sufficiently small so as to substantially eliminate deleterious wobbling of the calibration means as the calibration means is rotationally displaced independent of the cam shaft and of cam means 11. The characteristic of the calibration means to be able to rotate independent of the shaft and the cam means permits the calibration means to compensate for variations in mechanical components generally resulting when switches are mass produced.

Spring biased against the calibration means 12 is a first shoulder 24 of the cam means 11. The cam means has a double D-shaped aperture (not shown) which is in a slide fit with the double D-shaped section of the cam shaft. It is seen that the shoulder of the cam means predeterminately spaces detent cam 27 of the cam means from the calibration means. A spiral spring 25 is carried by the cam shaft and is positioned between the end plate 14 and second shoulder 26 under compression so that the cam means has its first shoulder 24 spring biased against the face of the calibration means. It is seen that the calibration means is carried by the cam shaft means between the first shoulder of the cam means and the C-shaped ring. The first shoulder includes a friction surface fabricated so that rotational displacement of the cam means by rotational displacement of the cam shaft causes a like rotational displacement of the calibration means.

The contour of the calibration means 12 is that of a gradual but constantly rising rise contour that traverses substantially 360 degrees of the periphery of the calibration means. The fall contour is distinct and is shown to be an abrupt fall contour, however, the fall contour may be sloping if so desired. The purpose of the gradual but constantly rising rise contour of the calibration means will be disclosed hereinlater.

The cam means 11 includes the detent cam 27 as described hereinbefore. The cam 27 has a periphery of alternate rise and fall contours. The detent cam 27 is illustrated as having three rise contours and three fall contours. These contours are utilized to determine three separate and distinct pressures to which the manually adjustable pressure responsive means will respond depending on which of the three positions the contours of the cam is cooperatively associated with cam follower arm 28 of U-shaped means 29. It is seen that the rise and fall contours are separated by approximately 90 degrees so that the aforementioned three fluid level positions may be obtained within a maximum 180 degree rotation of the cam shaft means. If additional fluid level positions are desired, additional contours may be formed on the periphery of the cam corresponding to the desired pressure levels at which the manually adjustable pressure responsive means is to actuate cooperatively associated electrical circuit. The three positions of the cam illustrated in the drawings are merely illustrative and not limiting in scope.

As shown in FIGURE 2, the U-shaped means 29 includes a follower arm 28 having a V-shaped extremity 30 that rides on the contours of detent cam 27. The valley of the contours of the detent cam 27 are such that the cam follower arm is biased thereagainst. The use of the rise contours of the detent cam 27 displaces the follower arm toward member 31 of the U-shaped means thereby storing energy in the follower arm. As the follower arm falls along the fall contours of the cam, the energy stored by the follower arm is thereby released. It will be noted that the U-shaped means 29 is fixedly connected to end plate 14 by any suitable means such as by rivet 32 or the like.

End plate 15 of the mounting bracket includes a projection 69 that underlies the cam shaft and that is substantially perpendicular to the end plate 15. A pin 70 is in an interfitting relationship with recess 71 of the cam shaft. It will be noted that as the cam shaft is rotationally displaced in the clockwise direction that at a predetermined point during the clockwise rotation of the cam shaft, the pin 70 will engage the projection 69 thereby prevent further clockwise rotational displacement of the cam shaft. If the cam shaft is thereafter displaced in the counterclockwise direction, after the cam shaft has been predeterminately displaced, the pin again engages the projection 69 thereafter preventing further displacement of the cam shaft in the counterclockwise direction.

Figures 3, 4, 5:
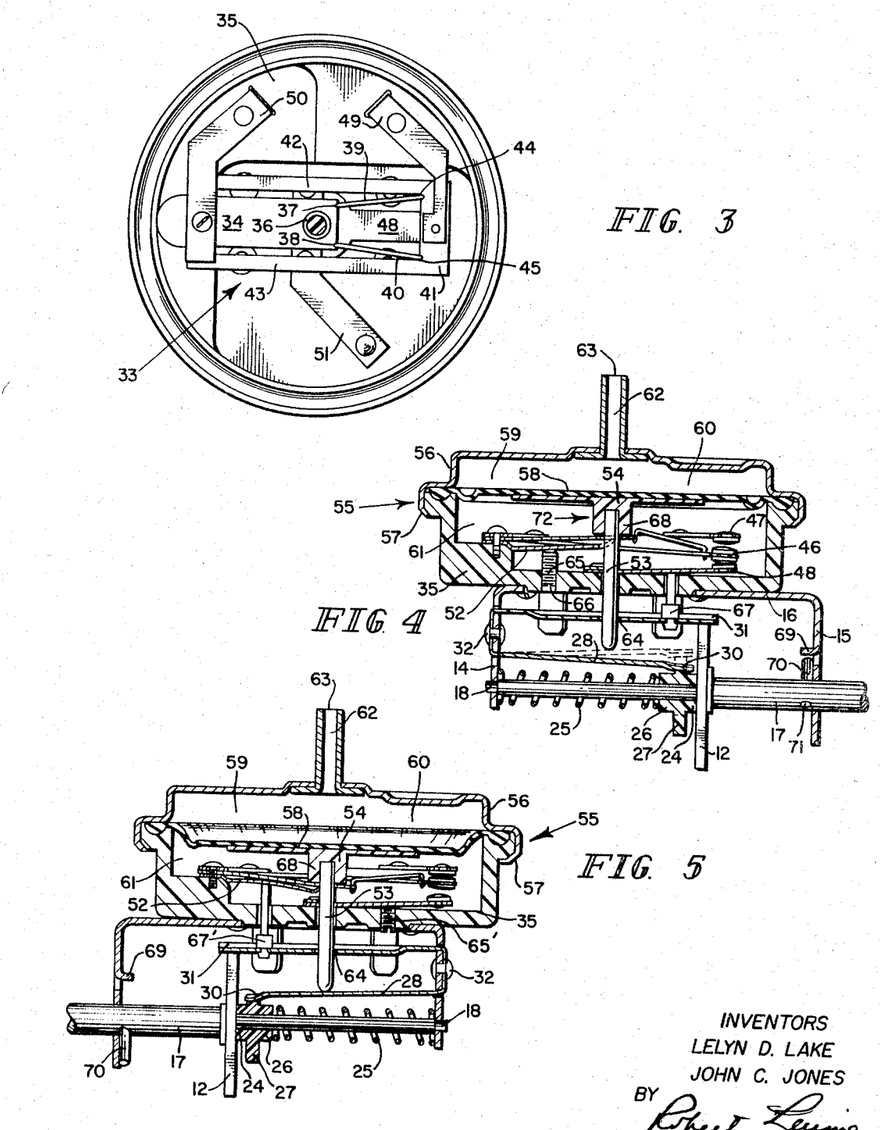
FIGURE 3 is a top view of the overcenter snap switch means illustrating the cooperative relationship between the various components of the overcenter snap switch.
FIGURE 4 is a cross-sectional view of the manually adjustable fluid pressure responsive means illustrating the overcenter snap switch and the cooperatively associated control means having provision for a plurality of fluid pressure levels and a fixed reset fluid pressure level.
FIGURE 5 is a cross-sectional view of an embodiment of the manually adjustable fluid pressure responsive means illustrating the overcenter snap switch and the cooperatively associated control means having provision for a plurality of fluid pressure levels having a constant differential reset fluid pressure level.

Referring now to FIGURE 3 which illustrates a novel overcenter snap switch 33 including an actuator arm 34 having one extremity thereof fixedly coupled to cup-shaped body section 35. The opposite extremity of the actuator arm includes an aperture 36 centrally located therein. The purpose of the centrally located aperture will appear hereinlater. A notch 37 and a notch 38 are formed in the latter mentioned extremity of the actuator arm and serve respectively as a seat for an extremity of straight line spring means 39 and as a seat for an extremity of straight line spring means 40.

Figure 6:
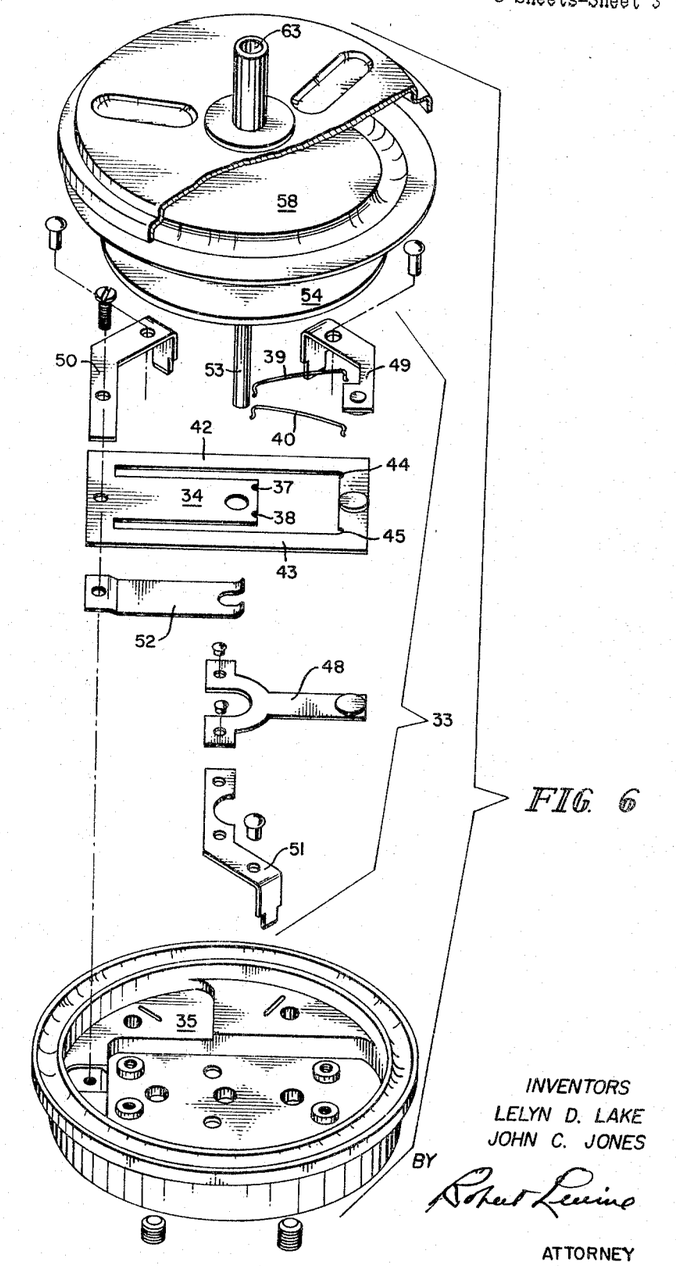
FIGURE 6 is an exploded perspective view illustrating the novel overcenter snap switch means of the present invention.

A contact carrying blade means 41 has leg 42 and leg 43 fixedly coupled to the cup-shaped body section 35. It is seen that a C-shaped aperture is formed in the contact carrying blade. The C-shaped aperture forms the actuator arm and is the aperture through which the actuator arm moves. FIGURE 6 illustrates that the contact carrying blade means and the actuator arm are fabricated from a unitary piece of electrically conductive metal.

It is seen that the straight line springs are utilized to cooperatively couple the actuator arm 34 to the contact carrying blade. As disclosed hereinbefore straight line spring 39 has one extremity thereof coupled to notch 37 of the actuator arm, it is seen that the opposite extremity of the straight line spring is coupled to corner 44 of the contact carrying blade. Straight line spring 40 has one extremity thereof coupled to notch 38 of the actuator arm and the opposite extremity of the spring is coupled to corner 45 of the contact carrying blade 41. The respective straight line springs are under compression when positioned between the actuator arm and the contact carrying blade as indicated in FIGURE 3.

A contact 46 is carried by the contact carrying blade. Overlaying the contact 46 is a second or fixed contact 47 and underlaying the contact 46 is first or movable contact 48. The fixed contact 47 is integral with terminal means 49 which projects outside of the cup-shaped body section 35. A second terminal means 50 projects outside of the cup-shaped body section and is used to electrically couple the actuator arm to an external means such as an electrical conduit means. The movable contact 48 is electrically connected to a third terminal means 51 as shown in FIGURE 3.

Underlaying the actuator arm 34 is return spring 52. The return spring is utilized to bias actuator arm 34 to the position illustrated in FIGURE 4 or the upward direction. With the actuator arm biased in the upward direction, it is seen that the contact carrying blade is biased to such a position that contact 46 carried by said blade engages movable contact 48. An electrical circuit may be traced from the second terminal means 50 through contact 46 and contact 48 to the third terminal means 51.

FIGURE 5 illustrates that a movable means 72 including a center plastic rod 53 and a substantially flat molded plastic backing means 54 has been displaced downward thereby displacing the actuator arm of the overcenter snap switch downwardly causing the contact 46 of the contact carrying blade means to disengage movable contact 48 with a snap action motion and engage fixed contact 47.

A housing or casing 55 incorporates an upper cup-like body section 56, open at its lower extremity, and an interfitting lower cup-like body section 35, open at its upper extremity, thus effectively closing the open lower extremity of the upper cup-like body section.

The upper body section includes an edge 57 circumjacent its outer periphery which is crimped or rolled over an annular of the lower body section so as to clinch both the upper body section and the lower body section securely in position with respect each to the other. The housing may be manufactured from any suitable material, but it is preferred that the upper body section 63 be fabricated from a sheet metal stamping and that the lower body section be fabricated from a suitable molded plastic.

A flexible sheet means such as a resilient diaphragm 58 is positioned within chamber 59 formed by the joining of the body sections so as to extend laterally thartwise the interior cross section of the housing. The resilient diaphragm has substantially smooth faces. It is seen that the chamber 59 is effectively partitioned into two separate and distinct compartments, that is, a first compartment or pressure compartment 60 and a second compartment or switch compartment 61.

A pressure orifice 62 is fixedly interfitted with the upper cup-like body section 56. The pressure orifice may be either pressure fitted, welded, or soldered in position of the lower body section. The pressure orifice has an aperture 63 extending its entire cross sectional length. A suitable tubing (not shown) is coupled to the orifice thereby permitting a fluid pressure present, if any, in the tubing to be transmitted through the tubing to the pressure compartment of the housing.

The molded plastic backing means 54 is substantially disc-shaped and underlies the central portion of the resilient diaphragm. The movable means includes the backing means 54 which is biased against the diaphragm by the cam follower arm 28 through the center plastic rod 53 which is integral with the backing means when it is desired to reset the overcenter snap switch. This will be more completely disclosed hereinlater. The purpose of the disc-shaped backing means is to maintain the center portion of the diaphragm substantially flat and to serve as a means and method of transmitting fluid pressure from the pressure compartment to the overcenter snap switch 33. It will be noted that no nodes are required on the diaphragm which interfit with apertures, if any, on the plastic backing means, if the means and methods of the present invention are utilized.

The overcenter snap switch is mounted in the switch compartment of the housing in the manner described hereinbefore. The center plastic rod projects through aperture 36 of the actuator arm 34, through a centrally located aperture 63 of the lower cup-like body section, through an aperture 64 to come to ride on the cam follower arm 28. It will be noted that the rod 53 is free to move through the aforementioned apertures without frictionally engaging said apertures. A shoulder 65 of the dsic-like backing means is shown engaged with the actuator arm 34 in FIGURE 4 and in FIGURE 5. It is the shoulder 65 that displaces the actuator arm so as to activate the overcenter snap switch of the present invention.

FIGURE 4 illustrates that the vertical distance between the actuator arm and the contact carrying blade may be varied by means of pin 67 which is connected to member 31 of the U-shaped means 29. Vertical displacement of the pin 67 vertically displaces the movable contact either further from the fixed contact 47 or closer to the fixed contact. It will be noted that in the initial position, the contact of the contact carrying blade is engaged with the movable contact. Vertical displacement of the movable contact will cause a like vertical displacement of the contact of the contact carrying blade. The vertical distance between the contact carrying blade and the actuator arm 34 substantially taken at notches 37 and 38 of the contact carrying blade varies thereby varying the vertical distance the actuator arm must traverse prior to actuation of the overcenter snap switch. The aforementioned variance in distance is directly proportional to a variance in fluid pressure required to be exerted on the actuator arm from the pressure compartment before the snap switch will be actuated from its initial position. It will be noted that the greater the vertical distance between the contact carrying blade and the actuator arm, the greater is the fluid pressure required to actuate the snap switch. The converse is also true, that is, the less the vertical distance between the actuator arm and the contact carrying blade the less fluid pressure required to actuate the snap switch. The ability of an operator to use the variable settings of the pin 67 affords a manually adjustable fluid pressure responsive means that may be made responsive to any one of a plurality of pressures contained within the pressure compartment.

The pressure level at which the snap switch will reset itself may be regulated by means of set screw means 65 being turned into or out of threaded aperture 66. FIGURE 4 clearly shows that the tip of the set screw means rides against the return spring 52 and the return spring rides against the actuator arm. The position of the set screw means within the threaded aperture determines the position of the return spring and hence the vertical distance separating the actuator arm and the contact carrying blade after the contact carrying arm has been displaced from its initial position. It is seen that the reset fluid pressure required to reset the overcenter snap switch will be the same regardless of the fluid pressure required to actuate the switch in the first instance.

The embodiment of FIGURE 5 illustrates substantially the same structure as FIGURE 4 except that the pin 67 is now pin 67' and engages the return spring 52 of the overcenter snap switch and set screw means 65 is now set screw means 65' and engages the movable contact 48. The set screw engaging the movable contact 48 is used for the setting of the differential pressure required between actuation and reset of the snap switch. The pin 67' is used to set the fluid pressure at which the overcenter switch will activate.

Having thus described the structure of the present invention, the cooperation between the described structural elements will be disclosed.

The cam shaft of FIGURE 4 is rotated until the desired fluid pressure level is indicated on a coded indicia means (not shown) attached to the cam shaft. The follower arm 28 of the U-shaped means interfits with the appropriate valley portion of the cam means 11. The frictional engagement of the cam means with the calibration means 12 arcuately displaces the calibration means 12 through substantially the same arcuate displacement as the cam means was displaced by the shaft. The contours of the calibration means are substantially constantly rising. The calibration means will displace the member 31 of the U-shaped means in the vertical direction thereby displacing the movable contact of the overcenter snap switch in the vertical direction. As disclosed hereinbefore, the movable contact 48 will displace the contact of the contact carrying blade 41 thereby regulating the vertical distance between the notches of the actuator arm and the contact carrying blade 46 thereby varying the distance required to displace the actuator arm before the contact carrying blade disengages movable contact 48 and engages fixed contact 47. The snap action is about to occur when the actuator arm is displaced to a horizontal line that substantially coincides with the horizontal line of the contact carrying blade drawn so as to pass through the notches of the actuator arm and the contact carrying blade. The initial displacement of the actuator arm by the vertical displacement of shoulder 68 due to the increase in pressure in the pressure chamber causes the gradual displacement of the actuator arm and the compression of the straight line springs between the actuator arm and the contact carrying blade. The overcenter snap switch does not actuate with a snap action motion until the actuator arm drops immediately beneath the horizontal line disclosed hereinabove. The forces of the switch are now such that the forces stored in the straight line springs are now released displacing the contact carrying blade upwardly with a snap motion so that the contact carrying blade disengages contact 48 and engages contact 47.

The return spring 52 governs at what fluid pressure the contact carrying blade will disengage contact 47 and engage contact 48. The magnitude of bias exerted against the return spring by the set screw is determined by the position of the set screw means 65 within the threaded aperture. The fluid pressure at which the diaphragm and the cooperatively associated shoulder 68 return to their respective initial positions is determined by the force exerted by return spring against the shoulder 68 through the means of the actuator arm 34.

The overcenter snap switch may be reset by simply rotating the cam means 11 by means of the shaft 17 such that the cam follower arm rides up one of the lobes of the cam 27 thereby displacing the cam follower arm in the upwardly direction. The upward displacement of the cam follower arm causes the arm to engage rod 53 and displace it in the upwardly direction. As a result thereof, shoulder 68 no longer biases the actuator arm in the downwardly direction thereby permitting the return spring to bias the actuator arm to the position shown in FIGURE 4. It will be noted that the overcenter snap switch is now reset to its initial position. The cam shaft is thereafter displaced to the pressure position it is desired that the switch be actuated. As disclosed hereinbefore, the calibration means is manually displaceable with respect to shaft 17 so that the calibration means may be manually set to bias rod 53 to the appropriate position so as to correspond to the desired detent position of detent cam 27. Thereafter this detent position on the detent will mark the corresponding position on the calibration means.

The embodiment of the present invention illustrated in FIGURE 5 operates in substantially the same manner as the invention shown in FIGURE 4 except that the position of the reset spring is determined by the position of pin 67' and member 31 of the U-shaped means. It is seen that the reset position of the overcenter snap switch may be varied merely by displacing the cam shaft to the appropriate position. The variance of the pressures to which the overcenter snap switch is responsive is governed by the position of set screw 65' within the threaded aperture (not shown).

While the invention illustrated and described in its preferred embodiment, it will be understood that modifications and variations may be effected without departing from the scope of the novel concepts of this invention and as set forth in the appended claims.

Having thus described our invention, we claim:

1. A manually adjustable condition responsive means actuated when a predetermined condition is exceeded comprising: a movable means responsive to a condition; a switch responsive to said displacement of said movable means after a predetermined condition is exceeded; means coupling said movable means to said switch; and an adjustable control means engaging said switch so as to prevent actuation of said switch until said condition is exceeded, said control means comprising a cam carrying shaft carrying a detent cam means having rise and fall contours and a calibration means having a floating characteristic on said shaft, a spring means biasing said detent cam into frictional engagement with said calibration means so that rotational displacement of said cam means rotationally displaces said calibration means, a U-shaped means including a cam follower arm riding on said contours of said detent cam, said cam follower arm and said detent cam cooperating to locate a predetermined position on said calibration means, a member of said U-shaped means riding on said contour of said calibration means and displaced in accordance with said contours thereof, a pin connected to said member and displaceable therewith, said pin biasing a movable contact of said switch to one of a plurality of positions thereby determining said predetermined condition to which said switch is responsive, and adjustable means determining the condition at which said switch is reset.

2. A manually adjustable fluid pressure responsive means actuated when a predetermined fluid pressure is exceeded comprising: a movable means responsive to a fluid pressure; an overcenter snap switch responsive to said displacement of said movable means after a predetermined fluid pressure is exceeded, said switch comprising a displaceable contact carrying blade means, a movable contact means normally engaging said contact carrying blade means, a fixed contact means normally disengaged with said contact carrying blade means, an actuator arm displacing said blade means to an engaged position with said fixed contact after said predetermined fluid pressure is exceeded, a straight line spring means coupling said actuator arm to said blade means, said spring means storing energy as said actuator arm is displaced and releasing said stored energy when said actuator arm exceeds said predetermined fluid pressure, means coupling said movable means to said actuator arm, and a return spring means for snapping back said blade means to engagement with said movable contact when said predetermined fluid pressure no longer exists; and an adjustable control means mounted in proximity with said switch so as to prevent actuation of said switch until said predetermined fluid pressure is exceeded, said control means comprising a cam carrying shaft carrying a detent means having rise and fall contours and a calibration means, means including a cam follower arm riding on said contours of said detent means, said cam follower arm and said detent means cooperating to locate a predetermined position on said calibration means, a member of said means riding on said contour of said calibration means and displaced in accordance with said contours thereof, a pin connected to said member and displaceable therewith, said pin biasing said movable contact of said switch to one of plurality of positions thereby determining said predetermined fluid pressure to which said switch is responsive, and adjustable means determining the fluid pressure at which said switch is reset.

3. A manually adjustable fluid pressure responsive means actuated when a predeteermined fluid pressure is exceeded comprising: a movable means responsive to a fluid pressure; an overcenter snap switch responsive to said displacement of said movable means after a predetermined fluid pressure is exceeded, said switch comprising a displaceable contact carrying blade means, a movable contact means normally engaging said contact carrying blade means, a fixed contact means normally disengaged with said contact carrying blade means, an actuator arm displacing said blade means to an engaged position with said fixed contact after said predetermined fluid pressure is exceeded, a straight line spring means coupling said actuator arm to said blade means, said spring means storing energy as said actuator arm is displaced and releasing said stored energy when said actuator arm exceeds said predetermined fluid pressure, means coupling said movable means to said actuator arm, and a return spring means for snapping back said blade means to engagement with said movable contact when said predetermined fluid pressure no longer exists; and an adjustable control means mounted in proximity with said switch so as to prevent actuation of said switch until said predetermined fluid pressure is exceeded, said control means comprising a cam carrying shaft carrying a detent cam means having rise and fall contours and a calibration means having a floating characteristic on said shaft, a spring means biasing said detent cam into frictional engagement with said calibration means so that rotational displacement of said cam means rotationally displaces said calibration means, a U-shaped means including a cam follower arm riding on said contours of said detent cam, said cam follower arm and said detent cam cooperating to locate a predetermined position on said calibration means, a member of said U-shaped means riding on said contour of said calibration means and displaced in accordance with said contours thereof, a pin connected to said member and displaceable therewith, said pin biasing said movable contact of said switch to one of a plurality of positions thereby determining said predetermined fluid pressure to which said switch is responsive, and adjustable means determining the fluid pressure at which said switch is reset.

4. A manually adjustable fluid pressure responsive means actuated when a predetermined fluid pressure is exceeded comprising: a housing; a flexible sheet mounted in said housing so as to define a first compartment and a second compartment, said flexible sheet having substantially smooth faces; a first aperture in said housing to said first compartment so that said compartment communicates with a fluid pressure; a second aperture in said housing to said second compartment; a movable means extending through said second aperture and engaging said sheet so that said movable means is displaced by said sheet as said sheet responds to said fluid pressure; a switch responsive to said displacement of said movable means after a predetermined fluid pressure is exceeded, said switch comprising a displaceable contact carrying blade means, a movable contact means underlying and normally engaging said contact carrying blade means, a fixed contact means overlying and normally disengaged with said contact carrying blade means, an actuator arm displacing said blade means to an engaged position with said fixed contact after said predetermined fluid pressure is exceeded, a straight line spring means coupling said actuator arm to said blade means, said spring means storing energy as said actuator arm is displaced and releasing said stored energy when said actuator arm exceeds said predetermined fluid pressure, means coupling said movable means to said actuator arm, and a return spring means snapping back said blade means to engagement with said movable contact when said predetermined fluid pressure no longer exists; and an adjustable control means mounted in proximity with said switch so as to prevent actuation of said switch until said predetermined fluid pressure is exceeded, said control means comprising a cam carrying shaft carrying a detent cam means having rise and fall contours and a calibration means having a floating characteristic on said shaft, a spring means biasing said detent cam into frictional engagement with said calibration means so that rotational displacement of said cam means rotationally displaces said calibration means, a U-shaped means including a cam follower arm riding on said contours of said detent cam, said cam follower arm and said detent cam cooperating to locate a predetermined position of said calibration means, a member of said U-shaped means riding on said contour of said calibration means and displaced in accordance with said contour thereof, a pin connected to said member and displaceable therewith, said pin biasing said movable contact of said switch to one of a plurality of positions thereby determining said predetermined fluid pressure to which said switch is responsive, and adjustable means determining the fluid pressure said switch is reset, said adjustable means including a means biasing said return spring to one of a plurality of positions thereby regulating said reset position of said switch.

5. A manually adjustable condition responsive means actuated when a predetermined condition is exceeded comprising: a movable means responsive to a condition; a switch responsive to said displacement of said movable means after a predetermined condition is exceeded; means coupling said movable means to said actuator arm; and an adjustable control means mounted in proximity with said switch so as to prevent actuation of said switch until said predetermined condition is exceeded, said control means comprising an adjustable means biasing a movable contact of said switch to one of a plurality of positions thereby determining said predetermined condition said switch is responsive, a cam carrying shaft carrying a detent cam means having rise and fall contours and a calibration means having a floating characteristic on said shaft, a spring means biasing said detent cam into frictional engagement with said calibration means so that rotational displacement of said cam means rotationally displaces said calibration means, a U-shaped means including a cam follower arm riding on said contours of said detent cam, said cam follower arm and said detent cam cooperating to locate a predetermined position on said calibration means, a member of said U-shaped means riding on said contour of said calibration means and displaced in accordance with said contours thereof, and a pin connected to said member and displaceable therewith, said pin biasing a return spring of said switch to one of a plurality of positions thereby determining the condition at which said switch is reset.

6. A manually adjustable fluid pressure responsive means actuated when a predetermined fluid pressure is exceeded comprising: a housing; a flexible sheet mounted in said housing so as to define a first compartment and a second compartment; a first aperture in said housing to said first compartment so that said compartment communicates with a fluid pressure; a second aperture in said housing to said second compartment; a movable means extending through said second aperture and engaging said sheet so that said movable means is displaced by said sheet as said sheet responds to said fluid pressure; a switch responsive to said displacement of said movable means after a predetermined fluid pressure is exceeded, said switch comprising a displaceable contact carrying blade means, a movable contact means underlying and normally engaging said contact carrying blade means, a fixed contact means overlying and normally disengaged with said contact carrying blade means, an actuator arm displacing said means to an engaged position with said fixed contact after said predetermined fluid pressure is exceeded, a straight line spring means coupling said actuator arm to said blade means, said spring means storing energy as said actuator arm is displaced and releasing said stored energy when said actuator arm exceeds said predetermined fluid pressure, means coupling said movable means to said actuator arm, and a return spring means for snapping back said blade means to engagement with said movable contact when said predetermined fluid pressure no longer exists; and an adjustable control means engaging said switch so as to prevent actuation of said switch until said predetermined fluid pressure is exceeded, said control means comprising an adjustable means biasing said movable contact of said switch to one of a plurality of positions thereby determining said predetermined fluid pressure said switch is responsive, a cam carrying shaft carrying detent cam means having rise and fall contours and a calibration means, a U-shaped means including a cam follower arm riding on said contours of said detent cam, said cam follower arm and said detent cam cooperating to locate a predetermined position on said calibration means, a member of said U-shaped means riding on said contour of said calibration means and displaced in accordance with said contours thereof, and a pin connected to said member and displaceable therewith, said pin biasing said return spring of said switch to one of a plurality of positions thereby determining the fluid pressure at which said switch is reset.

7. An overcenter snap switch comprising: a displaceable contact carrying blade means; a first contact means normally engaging said contact carrying blade means; a second contact means normally disengaged with said contact carrying blade means; an actuator arm displacing said blade means to an engaged position with said second contact after a predetermined condition is exceeded; a straight line spring means coupling said actuator arm to said blade means, said spring means storing energy as said actuator arm is displaced and releasing said stored energy when said actuator arm exceeds said predetermined condition; and a return spring means comprising a substantially flat portion spaced from and engageable with said actuating arm for snapping back said blade means to engagement with said movable contact when said predetermined condition no longer exists.

8. A manually adjustable condition responsive means actuated when a predetermined condition is exceeded comprising: movable means responsive to a condition; switch means responsive to said displacement of said movable means after a predetermined condition is exceeded, said switch comprising a contact carrying blade movable between a fixed contact and a movable contact; means coupling said movable means to said switch means; and adjustable control means engaging said switch so as to prevent actuation of said switch until said predetermined condition is exceeded, said control means comprising a shaft carrying detent means having rise and fall contours and calibration means having contours, predeterminately shaped means including follower means riding on said contours of said detent means, said follower means and said detent means cooperating to locate a predetermined position on said calibration means, a member of said predeterminately shaped means riding on said contours of said calibration means and displaced in accordance with said contours, means connected to said member and displaceable therewith, said means biasing said movable contact of said switch to one of a plurality of positions thereby determining said predetermined condition to which said switch is responsive.

9. A manually adjustable fluid pressure responsive means actuated when a predetermined fluid pressure is exceeded comprising: a housing; a flexible sheet mounted in said housing so as to define a first compartment and a second compartment; a first aperture in said housing to said first compartment so that said compartment communicates with a fluid pressure; a second aperture in said housing to said second compartment; movable means extending through said second aperture and engaging said sheet so that said movable means is displaced by said sheet as said sheet responds to said fluid pressure; switch means responsive to said displacement of said movable means after a predetermined fluid pressure is exceeded, said switch comprising a contact carrying blade movable between a fixed contact and a movable contact; means coupling said movable means to said switch means; and adjustable control means engaging said switch so as to prevent actuation of said switch until said predetermined fluid pressure is exceeded, said control means comprising a shaft carrying detent means having rise and fall contours and calibration means having a floating characteristic on said shaft, spring means biasing said detent means into engagement with said calibration means so that rotational displacement of said detent means rotationally displaces said calibration means, predeterminately shaped means including follower means riding on said contours of said detent means, said follower means and said detent means cooperating to locate a predetermined position on said calibration means, a member of said predeterminately shaped means riding on the contours of said calibration means and displaced in accordance with said contours, means connected to said member and displaceable therewith, said means biasing said movable contact of said switch to one of a plurality of positions thereby determining said predetermined fluid pressure to which said switch is responsive.

10. A manually adjustable fluid pressure responsive means actuated when a predetermined fluid pressure is exceeded comprising: a housing; a flexible sheet mounted in said housing so as to define a first compartment and a second compartment; a first aperture in said housing to said first compartment so that said compartment communicates with a fluid pressure; a second aperture in said housing to said second compartment; movable means extending through said second aperture and engaging said sheet so that said movable means is displaced by said sheet as said sheet responds to said fluid pressure; switch means responsive to said displacement of said movable means after a predetermined fluid pressure is exceeded, said switch comprising a contact carrying blade movable between a fixed contact and a movable contact; means coupling said movable means to said switch means; and an adjustable control means engaging said switch so as to prevent actuation of said switch until said predetermined fluid pressure is exceeded, said control means comprising a shaft carrying detent means having rise and fall contours and calibration means having a floating characteristic on said shaft, spring means biasing said detent means into engagement with said calibration means so that rotational displacement of said detent means rotationally displaces said calibration means, a U-shaped means including follower means riding on said contours of said detent means, said follower means and said detent means cooperating to locate a predetermined position on said calibration means, a member of said U-shaped means riding on the contours of said calibration means and displaced in accordance with said contours, means connected to said member and displaceable therewith, said means biasing said movable contact of said switch to one of a plurality of positions thereby determining said predetermined fluid pressure to which said switch is responsive, and adjustable means determining the fluid pressure at which said switch is reset.

11. A manually adjustable fluid pressure responsive means actuated when a predetermined fluid pressure is exceeded comprising: a housing; a flexible sheet mounted in said housing so as to define a first compartment and a second compartment; a first aperture in said housing to said first compartment so that said compartment communicates with a fluid pressure; a second aperture in said housing to said second compartment; a movable means extending through said second aperture and engaging said sheet so that said movable means is displaced by said sheet as said sheet responds to said fluid pressure; switch means responsive to said displacement of said movable means after a predetermined fluid pressure is exceeded, said switch comprising displaceable contact carrying blade means, movable contact means underlying and normally engaging said contact carrying blade means, fixed contact means overlaying and normally disengaged with said contact carrying blade means, an actuator arm displacing said blade means to an engaged position with said fixed contact after said predetermined fluid pressure is exceeded, straight line spring means coupling said actuator arm to said blade means, said spring means storing energy as said actuator arm is displaced and releasing said stored energy when said actuator arm exceeds said predetermined fluid pressure, means coupling said movable means to said actuator arm, and return spring means snapping back said blade means to engagement with said movable contact when said predetermined fluid pressure no longer exists; and adjustable control means engaging said switch so as to prevent actuation of said switch until said predetermined fluid pressure is exceeded, said control means comprising a cam carrying shaft carrying detent cam means having rise and fall contours and calibration means having a floating characteristic on said shaft, spring means biasing said detent cam into frictional engagement with said calibration means so that rotational displacement of said detent means rotationally displaces said calibration means, said calibration means capable of independent displacement with respect to said detent means and said cam carrying shaft, U-shaped means including a cam follower arm riding on said contours of said detent means, said cam follower arm and said detent cam cooperating to locate a predetermined position on said calibration means, a member of said U-shaped means riding on the contours of said calibration means and displaced in accordance with said contours, a pin connected to said member and displaceable therewith, said pin biasing said movable contact of said switch to one of a plurality of positions thereby determining said predetermined fluid pressure to which said switch is responsive, and adjustable means determining the fluid pressure at which said switch is reset, said adjustable means including means biasing said return spring to one of a plurality of positions thereby regulating said reset position of said switch means.

12. A manually adjustable fluid pressure responsive means actuated when a predetermined fluid pressure is exceeded comprising: movable means responsive to a condition; switch means responsive to said displacement of said movable means after a predetermined fluid pressure is exceeded, said switch comprising a contact carrying blade movable between a fixed contact and a movable contact; means coupling said movable means to said switch means; and adjustable control means engaging said switch so as to prevent actuation of said switch until said predetermined fluid pressure is exceeded, said control means comprising adjustable means biasing said movable contact of said switch to one of a plurality of positions thereby determining said predetermined fluid pressure to which said switch is responsive, shaft carrying detent means having rise and fall contours and calibration means having a floating characteristic on said shaft, means biasing said detent means into engagement with said calibration means so that rotational displacement of said detent means rotationally displaces said calibration means, predeterminately shaped means including follower means, riding on said contours of said detent means, said follower means and said detent means cooperating to locate a predetermined position on said calibration means, a member of said predeterminately shaped means riding on the contours of said calibration means and displaced in accordance with said contours thereof and means connected to said member and displaceable therewith, said means biasing said switch thereby determining fluid pressure at which said switch is reset.

13. A manually adjustable fluid pressure responsive means actuated when a predetermined fluid pressure is exceeded comprising: a housing; a flexible sheet mounted in said housing so as to define a first compartment and a second compartment; a first aperture in said housing to said first compartment so that said compartment communicates with a fluid pressure; a second aperture in said housing to said second compartment; a movable means extending through said second aperture and engaging said sheet so that said movable means is displaced by said sheet as said sheet responds to said fluid pressure; switch means responsive to said displacement of said movable means after a predetermined fluid pressure is exceeded, said switch comprising a contact carrying blade movable between a first fixed contact and a movable contact; means coupling said movable means to said switch means; and adjustable control means engaging said switch so as to prevent actuation of said switch until said predetermined fluid pressure is exceeded, said control means comprising adjustable means biasing said movable contact of said switch to one of a plurality of positions thereby determining said predetermined fluid pressure to which said switch is responsive, a shaft carrying detent means having rise and fall contours and calibration means having a floating characteristic on said shaft, spring means biasing said detent means into engagement with said calibration means so that rotational displacement of said detent means rotationally displaces said calibration means, said calibration means capable of independent displacement with respect to said detect means and said shaft, a U-shaped means including a follower means riding on said contours of said detent means, said follower means and said detent means cooperating to locate a predetermined position on said calibration means, a member of said U-shaped means riding on the contours of said calibration means and displaced in accordance with said contours thereof, and a pin connected to said member and displaceable therewith, said pin biasing said switch thereby determining the fluid pressure at which said switch is reset.

14. A manually adjustable fluid pressure responsive means actuated when a predetermined fluid pressure is exceeded comprising: a housing; a flexible sheet mounted in said housing so as to define a first compartment and a second compartment; a first aperture in said housing to said first compartment so that said compartment communicates with a fluid pressure; a second aperture in said housing to said second compartment; a movable means extending through said second aperture and engaging said sheet so that said movable means is displaced by said sheet as said sheet responds to said fluid pressure; a switch responsive to said displacement of said movable means after a predetermined fluid pressure is exceeded, said switch comprising a displaceable contact carrying blade means, a movable contact means underlaying and normally engaging said contact carrying blade means, a fixed contact means overlaying and normally disengaged with said contact carrying blade means, an actuator arm displacing said blade means to an engaged position with said fixed contact after said predetermined fluid pressure is exceeded, straight line spring means connecting said actuator arm to said blade means, said spring means storing energy as said actuator arm is displaced and releasing said stored energy when said actuator arm exceeds said predetermined fluid pressure, means coupling said movable means to said actuator arm, and return spring means snapping back said blade means to engagement with said movable contact when said predetermined condition no longer exists; and adjustable control means mounted in proximity with said switch so as to prevent actuation of said switch until said predetermined fluid pressure is exceeded, said control means comprising adjustable means biasing said movable contact of said switch to one of a plurality of positions thereby determining said predetermined fluid pressure to which said switch is responsive, a shaft carrying detent cam means having rise and fall contours and a calibration means having a floating characteristic on said shaft, spring means biasing said detent means into frictional engagement with said calibration means so that rotational displacement of said detent cam means rotationally displaces said calibration means, U-shaped means including a cam follower arm riding on said contours of said detent cam means, said cam follower arm and said detent cam means cooperating to locate a predetermined position on said calibration means, a member of said U-shaped means riding on said contour of said calibration means and displaced in accordance with said contours, and a pin connected to said member and displaceable therewith, said pin biasing said return spring of said switch thereby determining the fluid pressure at which said switch is reset.

15. An adjustable control means engaging a switch so as to prevent actuation of said switch until a predetermined condition is exceeded, said control means comprising: a shaft carrying detent means having rise and fall contours and calibration means having contours; predeterminately-shaped means including follower means riding on said contours of said detent means, said follower means and said detent means cooperating to locate a predetermined position on said contours of said calibration means; a member of said predeterminately-shaped means riding on the contours of said calibration means and displaced in accordance with said contours, and means connected to said member and displaceable therewith, said means biasing a movable contact of said switch to one of a plurality of positions thereby determining said predetermined condition to which said switch is responsive.

16. An adjustable control means engaging a switch so as to prevent actuation of said switch until a predetermined condition is exceeded, said control means comprising: a cam carrying shaft carrying detent cam means having rise and fall contours and calibration cam means having a floating characteristic on said shaft; spring means biasing said detent cam means into engagement with said calibration cam means so that rotational displacement of said detent means rotationally displaces said calibration means; predeterminately-shaped means including follower means riding on said contours of said detent means, said follower means and said detent means cooperating to locate a predetermined position on the contours of said calibration means; a member of said predeterminately-shaped means riding on said contours of said calibration cam and displaced in accordance with said contours; means connected to said member and displaceable therewith, said means biasing a movable contact of said switch to one of a plurality of positions thereby determining said predetermined condition to which said switch responds; and adjustable means determining the condition at which said switch is reset.

17. An adjustable control means engaging a switch so as to prevent actuation of said switch until a predetermined fluid pressure is exceeded, said control means comprising: adjustable means biasing a movable contact of said switch to one of a plurality of positions thereby determining said predetermined fluid pressure to which said switch is responsive; a cam carrying shaft carrying detent cam means having rise and fall contours and calibration cam means having a floating characteristic on said shaft; spring means biasing said detent cam means into engagement with said calibration cam means so that rotational displacement of said detent cam means rotationally displaces said calibration cam means, said calibration means capable of independent displacement with respect to said detent cam and said cam carrying shaft; U-shaped means including a cam follower arm riding on said contours of said detent cam means, said cam follower arm and said detent cam means cooperating to locate a predetermined position on the contours of said calibration cam means, a member of said U-shaped means riding on said contours of said calibration cam and displaced in accordance with said contours; pin means connected to said member and displaceable therewith, said pin means biasing return spring means of said switch to one of a plurality of positions thereby determining the fluid pressure at which said switch is reset.

18. A pressure responsive switch comprising: a pressure compartment; a diaphragmatic member activated by pressure in said compartment; an overcenter snap switch having a housing, a displaceable contact carrying blade means having one end connected to said housing, a movable contact means normally engaging said contact carrying blade means and having one end connected to said housing, a fixed contact carrying means normally disengaged from said contact carrying blade and connected to said housing, an actuator arm having one end connected to said housing and having another end connected to said diaphragmatic member and responsive to activation thereof, straight line spring means connected between said actuator arm and said contact carrying blade means, said straight line spring means storing energy therein as said diaphragmatic member displaces said actuator arm to a predetermined position, exceeding said position by continued displacement of said actuator arm by said diaphragmatic member causes said straight line spring means to release said stored energy so as to snap said contact carrying blade into engagement with said fixed contact, return spring means snapping said contact carrying blade into engagement with said movable contact when said position is no longer exceeded by said actuator arm; and adjustable control means biasing said movable contact to one of a plurality of positions thereby defining the position at which said actuator arm causes said straight line spring means to activate.

19. A pressure responsive switch comprising: a pressure compartment; a diaphragmatic member activated by pressure in said compartment; an overcenter snap switch having a housing, a displaceable contact carrying blade means having notched corners and having one end connected to said housing, a movable contact means normally engaging said contact carrying blade means and having one end connected to said housing, a fixed contact carrying means normally disengaged from said contact carrying blade and connected to said housing, an actuator arm having one end connected to said housing and having another end connected to said diaphragmatic member and responsive to activation thereof, said other end of said actuator arm having notched corners, at least two straight line spring means connected between said actuator arm and said contact carrying blade means, one end of one said straight line spring means seated in one notched corner of said actuator arm and the other end of said spring means seated in said notched corner of said blade means, said straight line spring means storing energy therein as said diaphragmatic member displaces said actuator arm to a predetermined position, exceeding said position by continued displacement of said actuator arm by said diaphragmatic member causes said straight line spring means to release said stored energy so as to snap said contact carrying blade into engagement with said fixed contact, return spring means biased against said actuator arm snapping said contact carrying blade into engagement with said movable contact when said position is no longer exceeded by said actuator arm; and adjustable control means biasing said movable contact to one of a plurality of positions thereby defining the position at which said actuator arm causes said straight line spring means to activate.

20. A pressure responsive switch comprising: a pressure compartment; a diaphragmatic member activated by pressure in said compartment; an overcenter snap switch having a housing, a displaceable contact carrying blade means having notched corners and having one end connected to said housing, a movable contact means normally engaging said contact carrying blade means and having one end connected to said housing, a fixed contact carrying means normally disengaged from said contact carrying blade and connected to said housing, an actuator arm having one end connected to said housing and having another end connected to said diaphragmatic member and responsive to activation thereof, said other end of said actuator arm having notched corners, at least two straight line spring means connected between said actuator arm and said contact carrying blade means, one end of one of said straight line spring means seated in one notched corner of said actuator arm and the other end of said spring means seated in said notched corner of said blade means, said straight line spring means storing energy therein as said diaphragmatic member displaces said actuator arm to a predetermined position, exceeding said position by continued displacement of said actuator arm by said diaphragmatic member causes said straight line spring means to release said stored energy so as to snap said contact carrying blade into engagement with said fixed contact, return spring means biased against said actuator arm snapping said contact carrying blade into engagement with said movable contact when said position is no longer exceeded by said actuator arm; and adjustable control means biasing said return spring to one of a plurality of positions thereby defining the position at which said actuator arm causes said straight line spring means to activate to thereby return said contact carrying blade to engagement with said movable contact.

References Cited by the Examiner

UNITED STATES PATENTS

| 2,389,014 | 11/1945 | Weber | 200—140 |
| 2,788,409 | 4/1957 | Grover | 200—67 |
| 3,178,531 | 4/1965 | Dawson | 200—83 |
| 3,197,595 | 7/1965 | Weber | 200—83 |

BERNARD A. GILHEANY, *Primary Examiner.*

G. MAIER, H. BROOME, *Assistant Examiners.*